US006870917B2

(12) United States Patent
Chen et al.

(10) Patent No.: US 6,870,917 B2
(45) Date of Patent: Mar. 22, 2005

(54) METHODS AND SYSTEMS FOR CALL INTERRUPTION SERVICES

(75) Inventors: Jennifer H. Chen, San Jose, CA (US); Paul J. Fellingham, Holmdel, NJ (US); Robert Sayko, Colts Neck, NJ (US)

(73) Assignee: AT&T Corp, New York, NY (US)

( * ) Notice: Subject to any disclaimer, the term of this patent is extended or adjusted under 35 U.S.C. 154(b) by 368 days.

(21) Appl. No.: 09/992,954

(22) Filed: Nov. 5, 2001

(65) Prior Publication Data

US 2004/0001581 A1 Jan. 1, 2004

(51) Int. Cl.[7] .............................................. H04M 3/42
(52) U.S. Cl. .................. 379/207.01; 379/201.02; 379/208.01; 379/215.01; 379/265.11; 379/218.02
(58) Field of Search ....................... 379/201.02, 208.01, 379/215.01, 218.02, 207.01, 202.01, 201.01, 265.11; 370/261, 352

(56) References Cited

U.S. PATENT DOCUMENTS

| | | | |
|---|---|---|---|
| 4,935,958 A | 6/1990 | Morganstein et al. | |
| 6,208,718 B1 | 3/2001 | Rosenthal | |
| 6,208,726 B1 * | 3/2001 | Bansal et al. | 379/208.01 |
| 6,310,946 B1 * | 10/2001 | Bauer et al. | 379/208.01 |
| 6,563,915 B1 * | 5/2003 | Salimando | 379/208.01 |

* cited by examiner

Primary Examiner—Ahmad F. Matar
Assistant Examiner—M. C. Ubiles

(57) ABSTRACT

Methods and systems are provided that can automatically facilitate busy line validation (BLV) and emergency interrupt (EI) services with the aid of various sensors and systems that can automatically determine the status of a given phone-line, and further provide a menu of services to a calling party. A calling party that encounters a busy signal during an attempt to call a called party can validate the status of the called line without the intervention of a human operator. If the called line is currently used for a voice conversation, as opposed to a modem or facsimile call, then the calling party can optionally interrupt the ongoing conversation with the permission of the called party.

12 Claims, 4 Drawing Sheets

METHODS AND SYSTEMS FOR CALL INTERRUPTION SERVICES

BACKGROUND OF THE INVENTION

1. Field of Invention

This invention relates to methods and systems that provide information to customers over telephone networks.

2. Description of Related Art

Occasionally, telephone customers attempt to call other customers only to encounter a busy signal. Depending on the nature of the call, the calling party may want to know if the line of the called party is in actual use and/or possibly interrupt any ongoing conversation on the called line.

Busy Line Validation (BLV) is a service that a calling party can use to verify that a phone-line is currently being used for voice conversation, as opposed to being disabled, accidentally off-hook (miscradled) or used for a modem/facsimile communication. If the called party is in the middle of another call, an operator can hear a garbled form of any ongoing activity on the called line, interpret the type of call based on the ongoing activity and inform the calling party of the status of the called party's line.

Emergency Interrupt (EI) is a service that can allow a calling party to interrupt an ongoing voice conversation of a called party. Assuming that the operator has determined that a called line is used for a voice conversation, the operator can establish a communication bridge with the called party, advise the called party of the interrupt request and, if the called party consents, allow the calling party to break into the called party's ongoing conversation.

Unfortunately, because existing BLV services rely on a human operator's judgment of garbled signals, a data or facsimile call may be easily misinterpreted as ongoing voice conversation, or a voice conversation can be mistaken for a malfunctioning or off-hook line. Additionally, due to the human operator's involvement, BLV and EI can be unduly expensive services. Thus, new technologies relating to BLV and EI services are desirable.

SUMMARY OF THE INVENTION

The invention provides an automatic method and system for Busy Line Validation (BLV) and Emergency Interrupt (EI) services that can enable a customer to validate a busy phone line and to make an emergency interruption of a busy phone line.

In various embodiments, a technique for BLV is provided by first receiving a validation request associated with a communication terminal, such as a telephone, using an automated device. By measuring various digital and analog states, the status of a communication line associated with the communication terminal can be determined and subsequently provided to a requesting party.

In other embodiments, if a communication line is busy with a voice call, a technique for automatically processing an interrupt request is provided by receiving an emergency interrupt request, generating an interrupt message on the communication line to inform a called party of the emergency interrupt request and optionally connecting a calling party to a called party.

Other features and advantages of the present invention are described below and are apparent from the accompanying drawings and from the detailed description which follow.

BRIEF DESCRIPTION OF THE DRAWINGS

The invention is described in detail with reference to the following figures wherein like numerals reference like elements, and wherein.

DETAILED DESCRIPTION OF PREFERRED EMBODIMENTS

Occasionally, telephone customers attempt to call other customers only to encounter a busy signal. Depending on the nature of the call, the calling party may want to know if the line of the called party is in actual use and/or possibly interrupt any ongoing conversation on the called line.

Figure 1:
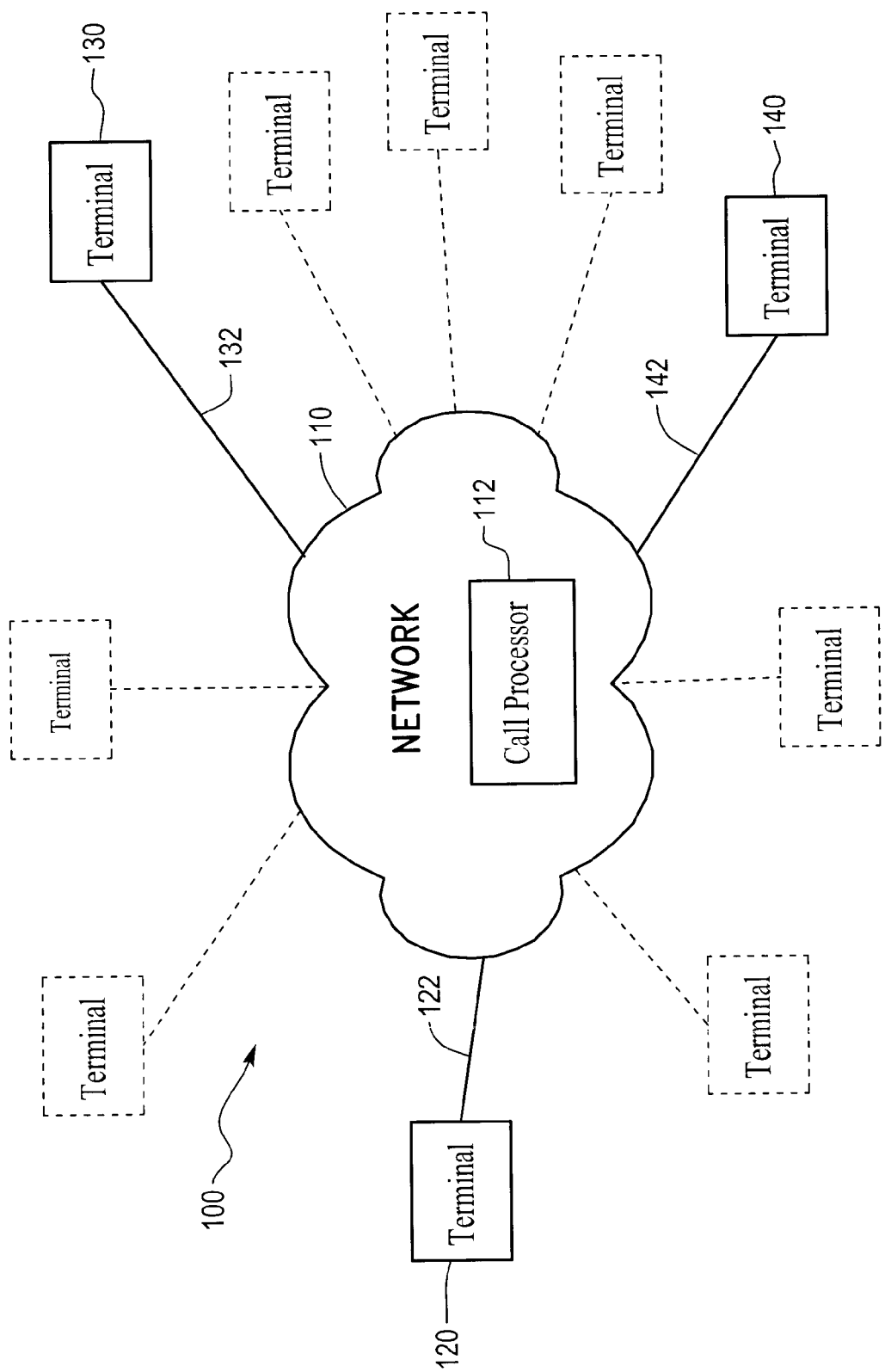
FIG. 1 is a block diagram of an exemplary communication network.

FIG. 1 is an exemplary diagram of a call processing system 100. The system includes a network 110 connected to a number of customers 120–140 by links 122–142 and containing a call processor 112.

The exemplary network 110 is a Public Switched Telephone Network (PSTN). However, it should be appreciated that the network 110 can be any known or later developed system for distributing communications signals, such as a telephone network, a data network such as the Internet, a Hybrid Fiber-Coax (HFC)-based network and the like, without departing from the spirit and scope of the present invention.

The exemplary terminals 120–140 are telephones or telephone-based systems capable of communicating by various techniques, such as voice calls, modem/data calls and facsimile calls. However, it should be appreciated that the terminals 120–140 can alternatively be any known or later developed combination of systems and devices, such as computers, specialized communication interfaces, data distribution nodes and the like, without departing from the spirit and scope of the present invention.

The exemplary links 122–142 are wired telephone lines, such as Subscriber Line Interface Circuits (SLICs). However, the links 122–142 may alternatively be serial/parallel cable connections, satellite links, wireless links, optical links, connections over a wide area network or a local area network, connections over an intranet, connections over the Internet, connections over any other distributed processing network or system and even software devices linking various software systems. In general, the links 122–142 may be any known or later developed connection systems, computer programs or structures usable to couple the customers 120–140 to the network 110 without departing from the spirit and scope of the present invention.

In operation, various customers can access the terminals 120–140 to communicate with other customers, parties and devices. The terminals 120–140 can provide various communication signals to the network 110 and receive communication signals from the network 110. The network 110 in turn can provide the appropriate communication paths to facilitate communication between any two terminals. For example, a first customer using terminal 130 can request to communicate with a second customer using terminal 140 by "dialing" or otherwise entering a code, such as a phone number or Internet Protocol (IP) address, associated with terminal 140. The network 110 can recognize the phone number of terminal 140 and provide a communication path, or "line", between terminal 130 and terminal 140. The communication line can remain in place until one or both customers terminate the conversation by providing a termination indicator, such as an on-hook signal generated by hanging up a phone.

Once the communication line between terminals 130 and 140 is established, it should be appreciated that the communication line can remain exclusive. That is, as long as the communication line between terminals 130 and 140 remains in place, other customers using other terminals cannot generally access terminals 130 and 140. For example, a third customer using terminal 120 attempting to access terminal 130 cannot generally break into any ongoing communication between terminals 130 and 140, but will instead receive a "busy signal" or some other indication that terminal 130 is not available.

During operation, as various communications occur between the terminals 120–140, the call processor 112 can initiate monitoring of the status of each terminal 120–140. For example, in various embodiments, the processor 112 can monitor various discreet states associated with each terminal 120–140. For instance, in the PSTN, by measuring the electrical load on a SLIC, the existence of a phone on the SLIC can be determined as well as the on-hook/off-hook state of the phone. Furthermore, in various embodiments, the call processor 112 can access various status-bits indicating that a particular communication line is subject to one of various lossy compression techniques. Because many communications networks are designed to detect and avoid compressing modem/facsimile/data communications, any indication that a communication line is undergoing lossy compression can indicate that the communication line is being used for a voice call.

Regarding the terminals 120–140, it should also be appreciated that a particular terminal can occasionally malfunction or be handled inappropriately. For example, a customer may remain off-hook by accidentally failing to properly "cradle" a phone receiver. As a result, a signal will be transmitted to the network 110 indicating that the phone is unavailable, e.g., off-hook, even though the phone is not in actual use, and any other customer trying to access the off-hook phone will again receive a busy indication.

In addition to various discrete states, the processor 112 can also measure analog activity on a particular link to determine the type of traffic on the link. For example, by measuring the amount of overall audio energy generated by a terminal, the processor 112 can determine whether the terminal is in actual use or accidentally off-hook/malfunctioning. That is, assuming a terminal is currently used by a customer, the energy generated by the terminal will likely be higher than the energy generated by a terminal that is accidentally off-hook or malfunctioning.

In still other embodiments, assuming that a particular terminal is in active use, the processor 112 can measure and categorize the type of communication the terminal is being used for by analyzing the various analog signals generated by and received by the terminal. For example, because the frequency spectrum of a human voice is likely to contain fewer numbers of different frequencies than the spectrum of a facsimile or modem signal, with each frequency of the voice signal likely having multiple harmonics, a voice call can be distinguished from a modem/facsimile communication by measuring the signals on a line, performing a transform, such as a Fourier transform, on the measured signals and executing a spectral analysis on the transform signals. Alternatively, the equivalent information can be determined by observing the zero-crossings-to-extrema ratio of a signal or performing any number of known or later developed heuristic or voice recognition techniques without departing from the spirit and scope of the invention.

In still other embodiments, the call processor 112 can measure and analyze various states over a prolonged time or even during the entirety of a communication to classify the communication. For example, in various embodiments, the call processor 112 can receive an off-hook indication from terminal 130. In response, the call processor 112 can continuously monitor the various signals transmitted to and received from terminal 130. By looking for patterns of known signals, such as sequences of dial-tones, Dual-Tone-Multiple-Frequency (DTMF) signals and various modem/facsimile handshake tones, the nature of a call can be accurately determined. For instance, if the call processor 112 detects a series of DTMF tones followed by a V.34 modem handshake sequence, the call processor 112 can classify the communication as a modem call.

An advantage to using such automated measurement techniques is that the nature of a phone call can be far more accurately determined as compared to the determinations made by human operators, who can typically devote only a very limited time to making such determinations and, in order to protect the confidentiality of customers, can only access a garbled form of the communication.

Returning to FIG. 1, it should be appreciated that a customer associated with terminal 120 may desire to call terminal 130 while a communication is ongoing between terminals 130 and 140. Accordingly, the customer at terminal 120 (the "calling party") will not gain access to terminal 130, but instead will receive a busy indication, such as a busy-tone, or be directed to a voice-mail account associated with terminal 130. Depending on the nature of the calling party's call and/or the number of dialing attempts by the calling party, the calling party may wish to verify whether the called terminal 130 is currently being used for voice communication, as opposed to being accidentally off-hook or used for a facsimile or modem call.

Accordingly, upon receiving a busy signal, the calling party at terminal 120 can enter a special code to the call processor 112 indicating that the calling party wishes to make a BLV request. For example, a calling party can invoke a BLV request by pressing "#411" on a phone after hearing a busy signal, and the calling party can thereafter enter various menu-driven optional commands by pressing the various available phone buttons. While the exemplary call processor 112 can receive commands using DTMF signals, it should be appreciated that the call processor 112 can alternatively receive commands using any known or later developed technique, such as using special electronic signals, voice-commands and the like, without departing from the spirit and scope of the present invention. The calling party can also enter the special code to the call processor upon hearing a ringing of the called terminal 130. For example, if the called party subscribes to a call waiting feature, the calling party may enter the special code after an extended period of ringing to alert the called party of the high priority call. If the called party's terminal 130 is on hook, the calling party may be informed of this condition by a special return tone, a message, etc.

After receiving a BLV request, the call processor 112 can access or otherwise measure the various digital and analog signals associated with the called terminal. For example, as discussed above, the call processor 112 can access various digital signals, e.g., signaling-bits, to determine if a terminal is on-hook/off-hook, whether the terminal is coupled to another terminal using an active communication line in the network 110 and whether the communication line is compressed. Furthermore, the call processor 112 can access or otherwise measure various analog signals, such as the signals transmitted from and received by the called terminal.

Once the various digital and/or analog signals are measured, the call processor 112 can then perform any number of operations on the measured signals to determine the status of the called terminal as well as classify any communication associated with the called terminal. For example, as discussed above, the call processor 112 can determine whether a called terminal, such as a telephone, is connected to a SLIC, whether a called terminal is actively used, miscradled or otherwise malfunctioning. If the call processor determines that the called terminal is actively communicating with another device, then the call processor can determine the nature of the communication by analyzing the measured signals to classify a particular communication, for example, as one of a voice, modem, data or facsimile communication.

While the exemplary network 110 uses the call processor 112 to measure and determine status information for a given communication line, it should be appreciated that status information or equivalent information for a given line can be determined using any number of devices distributed throughout the network 110 without departing from the spirit and scope of the present invention. For example, many telephone networks can provide equivalent information using a Quality of Service (QoS) value, which is an indication that the traffic on a particular communication line, for example, is one of a voice, modem, data or facsimile communication.

Furthermore, the form of the call processor 112 and distribution of its functions can vary with different network types. For example, if the network 110 is an Internet Protocol (IP)-based network, the status of a particular terminal and nature of an ongoing communication can be measured and determined using a specially adapted device or modified IP server embedded in the network 110. Alternatively, status information can be extracted directly from the terminals 120–140.

Similarly, if the network 110 is a Hybrid Fiber-Coax (HFC) network, the status of a terminal and the type of ongoing communication can be measured and determined using devices, such as an embedded Multimedia Terminal Adapter (MTA), Cable Modem Termination System (CMTS), or a similar device. Accordingly, it should be appreciated that the particular form of the call processor 112 and distribution of its functions can vary according to any known or later developed type of network without departing from the spirit and scope of the present invention.

Once the call processor 112 has determined the status of the called terminal, the call processor 112 can provide the status of the called terminal or can simply inform the calling party whether the called terminal is actively used for a voice communication. The calling party can then terminate any communication with the call processor 112; or if the called terminal is available to be interrupted, i.e., the called terminal is used for a voice communication, the calling party can request an Emergency Interrupt (EI) of the called terminal.

Returning to FIG. 1, it should be appreciated that, as with BLV services, the call processor 112 can also receive and process EI commands. For example, a calling party can invoke an EI request by pressing "#911" on a phone and can thereafter enter various optional commands by pressing the various phone buttons available.

Once the call processor 112 receives an EI request, the call processor 112 can send a message to the called terminal indicating that a calling party wishes to interrupt the ongoing conversation or otherwise make contact with a particular party or terminal.

To contact a called party, the exemplary call processor 112 can break into the communication line of the called terminal and play a pre-recorded or synthesized message to the called terminal. Optionally, the call processor 112 can allow the calling party to record a short message, on a recording device 260, that can be replayed to the called terminal. However, the particular form of an EI announcement can vary and can take any reasonable or useful form without departing from the spirit and scope of the present invention.

In various embodiments, once the call processor 112 provides an EI announcement to the called terminal, a party at the called terminal can optionally terminate the ongoing conversation with the understanding that the called party will immediately be connected to the calling party. The call processor 112 can then "ring" the called terminal and provide a communication line between the calling and called terminals.

In other embodiments, instead of hanging up and waiting for a call from the calling party, the called party can send a "flash" signal to the call processor 112 and connect with the calling party in a manner similar to that of call waiting services.

In still other embodiments, the called party can send a reply signal to the call processor 112, such as a DTMF tone or voice response, either accepting or rejecting the EI request. If the called party does not accept the EI request, the call processor 112 can provide an appropriate message to the calling party. However, if the called party accepts the EI request, the call processor 112 can provide a communication bridge between the calling and called parties such that the calling and called parties can directly communicate while optionally excluding any third parties from the new communication. In other exemplary embodiments, the call processor connects the calling and called parties and then removes itself from the call. The communication between the calling and called parties can then continue until one of the parties terminates the call.

While the exemplary network 110 and call processor 112 can provide an EI service after an initial BLV service is requested, it should be appreciated that an EI service can be requested without first requesting a BLV. For example, a calling party can immediately request an EI after hearing a busy signal. The call processor 112 can receive the EI request and automatically perform a BLV. If the called terminal is available, i.e., the called terminal is used for a voice communication, the call processor 112 can immediately provide any of the above-described EI services to establish communication between the calling and called parties with a minimum of delay.

Figure 2:
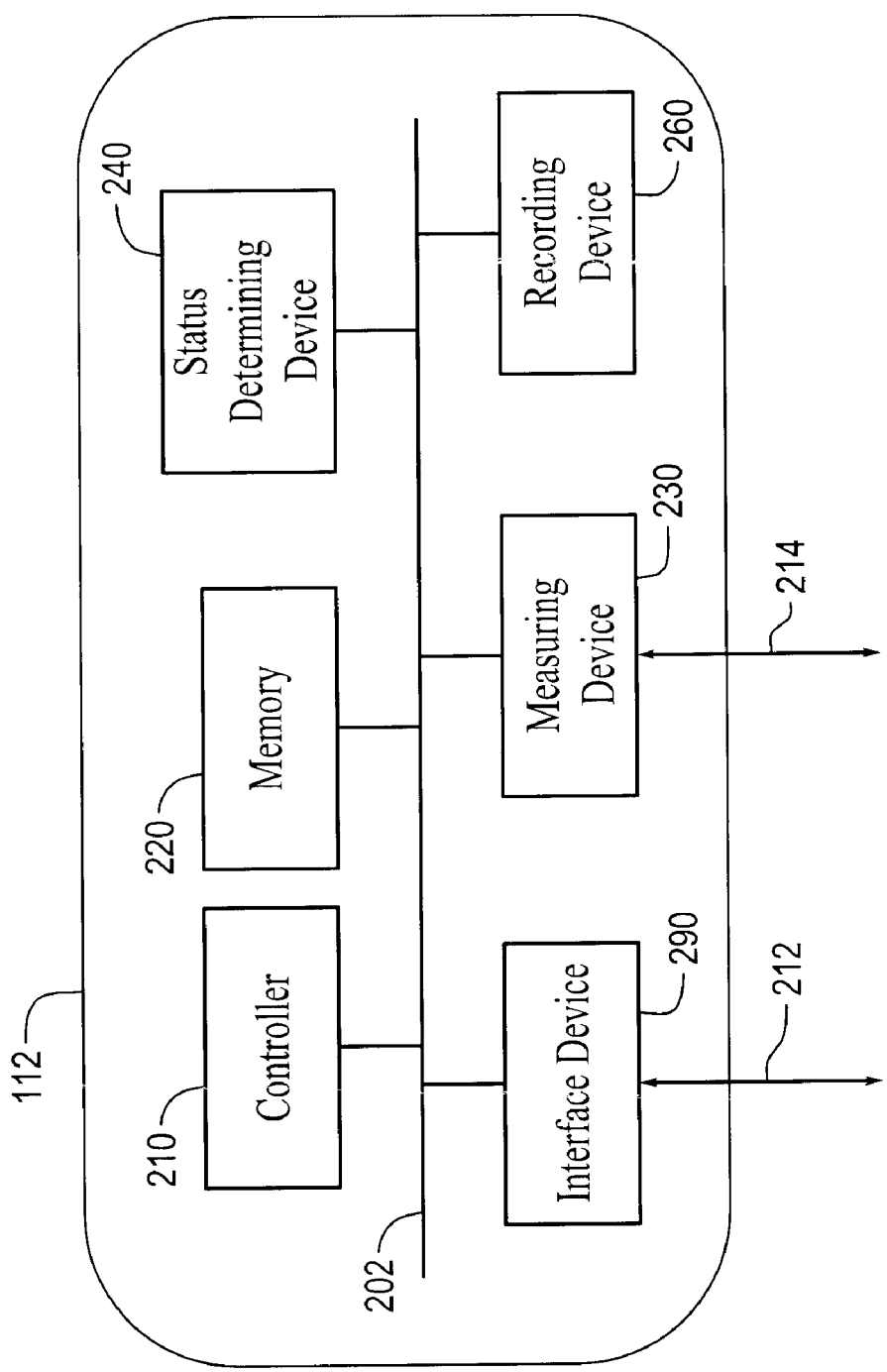
FIG. 2 is a block diagram of the exemplary call processor of FIG. 1.

FIG. 2 is a block diagram of the call processor 112 of FIG. 1. As shown in FIG. 2, the call processor 112 includes a controller 210, a memory 220, a measuring device 230, a status determining device 240, and an interface device 290. The above components 210-290 are coupled together by control/data bus 202. Although the exemplary call processor 112 uses a bussed architecture, it should be appreciated that any other architecture may be used as is well known to those of ordinary skill in the art.

In operation and under control of the controller 210, the interface device 290 can receive various communication signals, such as BLV and EI service requests from a calling party directed to a particular called terminal, via link 212, and store the various communication signals and commands in the memory 220.

Upon receiving a BLV or EI service request, the controller 210 can direct the measuring device 230 to measure or otherwise access various measured digital and analog signals associated with the called terminal and respective communication line using link 214. As discussed above, the measured signals can include various digital signals, such as on-hook/off-hook indications, various analog signals transmitted by or received from the called terminal as well as any other digital and/or analog signal useful for determining the status of a terminal or nature of a communication, without departing from the spirit and scope of the present invention.

Once the measuring device 230 has measured or otherwise received the signals of interest or equivalent information, the measuring device 230 can provide the signals to the status determining device 240.

The status determining device 240 can receive the various signals and determine the state of the called terminal and the nature of any communication between the called terminal and another device. That is, the status determining device 240 can classify any traffic on a communication line as one of a voice communication, a data/modem communication, a facsimile communication or any type of known communication. As discussed above, the state of a called terminal and nature of an associated communication can be determined using any of various techniques, such as analyzing energy levels, harmonic content, sequences of known signals such as DTMF and modem/facsimile handshake signals, or any other known or later developed approach useful to determine the state of a terminal and/or nature of a communication, without departing from the spirit and scope of the present invention.

Once the status determining device 240 has determined the state of the called terminal and nature of any associated communication, the controller 210 can send a signal to the calling party indicating whether the called terminal is engaged in a voice conversation or otherwise available to be interrupted.

If the first command received is a BLV request, then the controller 210 can optionally request an indication from the calling party whether the calling party wishes to request an EI service. If an EI request is subsequently received, or if the first command received is an EI request, the call processor 112 can then provide the EI services or otherwise direct external systems (not shown) to provide or otherwise enable the EI services.

As discussed above, the form of the EI services can vary and can include a "ring" to the called party and subsequent connection with the calling party, allowing the called party to access the calling party in a manner similar to call waiting or providing a communication bridge between the calling and called parties such that the calling and called parties can immediately communicate while optionally excluding any third parties. However, the particular form of the EI services can vary as desired and can take any form useful to inform a called party of an EI request and optionally facilitate subsequent communication between the calling and called parties without departing from the spirit and scope of the present invention.

Figure 3:
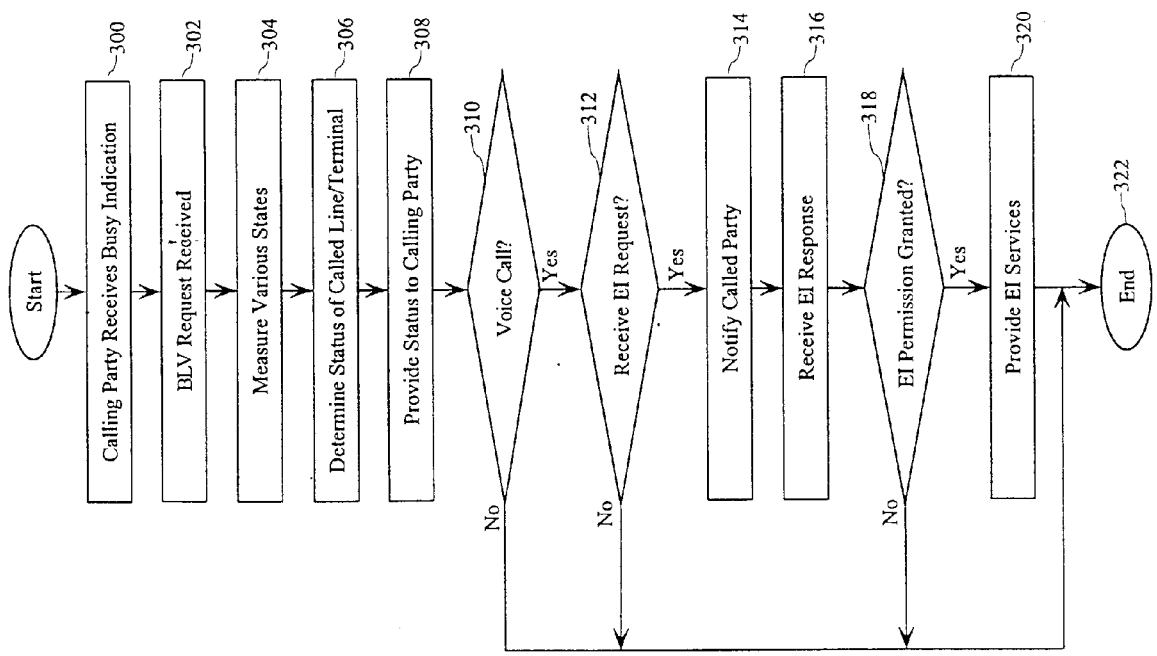
FIG. 3 is a flowchart outlining an exemplary operation for call processing.

FIG. 3 is a flowchart outlining an exemplary operation for performing BLV and EI services. The operation begins in step 300 where a calling party receives a busy indication in response to an attempted call to a called terminal. Next, in step 302, a BLV request made by the calling party is received by a device, such as a call processor. The process continues to step 304.

In step 304, various states for the called terminal and any associated communication line are measured. As discussed above, the measured signals can include various digital signals, such as on-hook/off-hook indications, various analog signals transmitted by or received from the called terminal as well as any other digital and/or analog signals useful for determining the status of a terminal or nature of a communication, without departing from the spirit and scope of the present invention. The process continues to step 306.

Next, in step 306, a determination is made as to the state of the called terminal and the nature of any ongoing communication associated with the called terminal. As discussed above, the state of a called terminal and nature of an associated communication can be determined using any of various techniques, such as analyzing energy levels, harmonic content, sequences of known signals, such as DTMF and modem/facsimile handshake signals, or any other known or later developed approach useful to determine the state of a terminal and/or nature of a communication without departing from the spirit and scope of the present invention. The process continues to step 308.

In step 308, the status information relating to the called terminal and associated communication line determined in step 306 is provided to the calling party. Then, in step 310, a determination is made as to whether the status information derived in steps 304 and 306 indicates that a voice communication is ongoing with the called terminal. If a voice communication is indicated, the process continues to step 312; otherwise, control jumps to step 322 where the process stops.

In step 312, a determination is made as to whether an EI request is/was received from the calling party. If an EI request is received, control continues to step 314; otherwise, control jumps to step 322 where the process stops.

In step 314, the called party is notified of the calling party's EI request. Then, in step 316, a response to the EI is received from the called party. Next, in step 318, a determination is made as to whether the called party has granted permission for the calling party to interrupt the ongoing conversation. If permission is granted, control continues to step 320; otherwise, control jumps to step 322 where the process stops.

In step 320, the EI services granted by the called party are performed. As discussed above, the form of the EI services can vary and can include a "ring" to the called party and subsequent connection with the calling party, allowing the called party to access the calling party in a manner similar to call waiting, or providing a communication bridge between the calling and called parties such that the calling and called parties can immediately communicate while optionally excluding any third parties. Control then continues to step 322 where the process stops.

Figure 4:
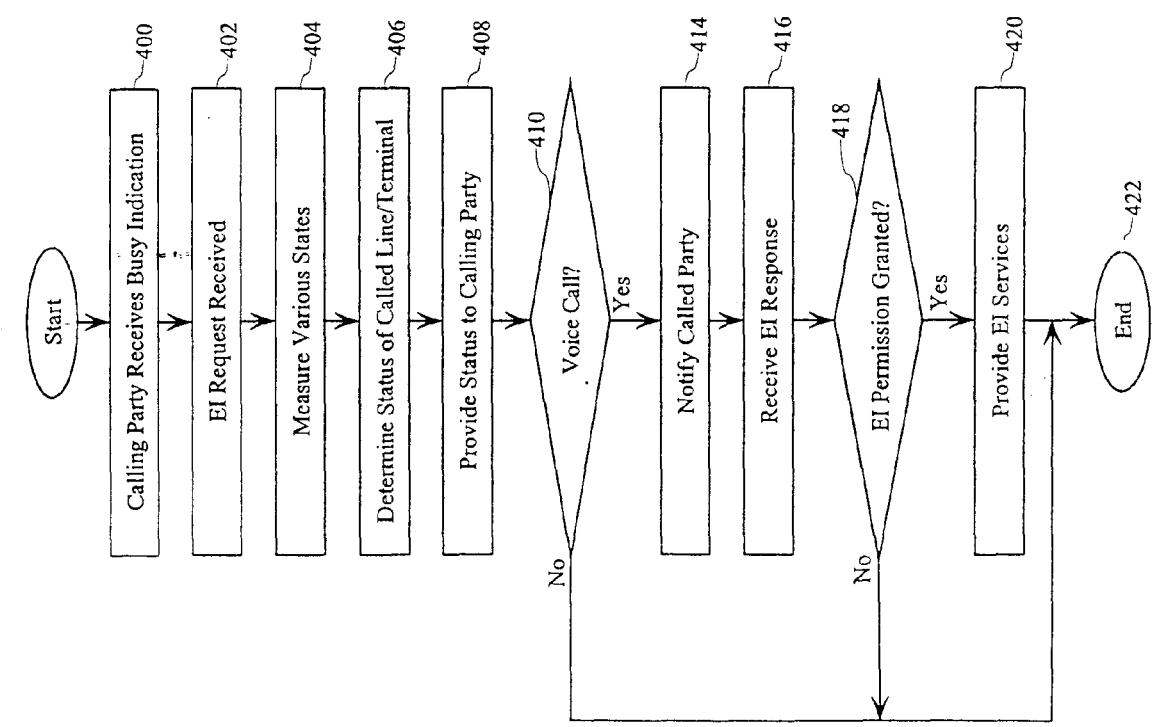
FIG. 4 is a flowchart outlining a second exemplary operation for call processing.

FIG. 4 is a flowchart outlining an exemplary operation for performing EI services without first requesting a BLV service. The operation begins in step 400 where a calling party receives a busy indication in response to an attempted call to a called terminal. Next, in step 402, an EI request made by the calling party is received by a device, such as a call processor. The process continues to step 404.

In step 404, various states relating to the called terminal and any associated communication line are measured. Next, in step 406, a determination is made as to the state of the called terminal and the nature of any ongoing communication associated with the called terminal. Then, in step 408, the status information of the called terminal and associated communication line determined in step 406 is provided to the calling party. Control continues to step 410.

In step 410, a determination is made as to whether the status information derived in steps 404 and 406 indicates that a voice communication is ongoing with the called terminal. If a voice communication is indicated, control continues to step 414; otherwise, control jumps to step 422 where the process stops.

In step 414, the called party is notified of the calling party's EI request. Then, in step 416, a response to the EI is received from the called party. Next, in step 418, a determination is made as to whether the called party has granted permission for the calling party to interrupt the ongoing conversation. If permission is granted, control continues to step 420; otherwise, control jumps to step 422 where the process stops.

In step 420, the EI services granted by the called party are performed. Control then continues to step 422 where the process stops.

The methods of this invention are preferably implemented using a switching array (not shown) coupled to a specialized processor and other dedicated communication hardware. However, the call processor 112 alternatively can be implemented using any combination of one or more programmed special purpose computers, programmed microprocessors or micro-controllers and peripheral integrated circuit elements, ASIC or other integrated circuits, digital signal processors, hardwired electronic or logic circuits, such as discrete element circuits, programmable logic devices such as a PLD, PLA, FPGA or PAL, or the like. In general, any device capable of implementing a finite state machine that is in turn capable of implementing the flowcharts shown in FIGS. 3 and 4 can be used to implement the call processor 112.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. Thus, there are changes that may be made without departing from the spirit and scope of the invention.

What is claimed is:

1. A method for processing a busy call, comprising:

receiving a busy line validation request from a calling party for a communication terminal; and automatically determining a status condition associated with a communication path linking said communication terminal, wherein said determining said status comprises:

measuring one or more measured signals associated with the communications path; and characterizing the communication path based on the one or more measured signals; and providing an indication of the status condition to the calling party in response to the busy line validation request.

2. The method of claim 1, wherein the communication path is a telephone line.

3. The method of claim 1, wherein measuring the one or more measured signals includes performing a harmonic measurement.

4. The method of claim 1, wherein measuring the one or more measured signals includes performing an energy measurement.

5. The method of claim 1, wherein measuring the one or more measured signals includes measuring a pattern of handshake signals for one of a modem and facsimile communication.

6. The method of claim 1, wherein measuring the one or more measured signals includes performing a digital state measurement.

7. The method of claim 1, further comprising receiving an interrupt request directed to the communication terminal.

8. The method of claim 7, further comprising providing an interrupt message to the communication terminal.

9. The method of claim 8, further comprising connecting a calling party with the communication terminal.

10. A method for processing a call, comprising:

receiving an interrupt request from a calling party directed to a communication terminal;

automatically determining the nature of a communications path associated with the communication terminal, wherein said determining the nature comprises:

measuring one or more measured signals associated with the communications path; and characterizing the communications path based on the one or more measured signals; and if the communication carries a voice communication, providing an interrupt message to the communication terminal.

11. The method of claim 10, measuring one or more measured signals includes performing an energy measurement.

12. The method of claim 11, wherein the communication terminal is a telephone line.

* * * * *